(12) United States Patent
Batten et al.

(10) Patent No.: US 11,408,711 B1
(45) Date of Patent: *Aug. 9, 2022

(54) INFRARED FIREARM SIGHT CAMERA ATTACHMENT, SYSTEM AND METHOD

(71) Applicant: Guneye, LLC, Palm Bay, FL (US)

(72) Inventors: William Batten, Palm Bay, FL (US); Steve Kraft, Rockledge, FL (US)

(73) Assignee: GUNEYE, LLC, Palm Bay, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,037

(22) Filed: Oct. 30, 2020

Related U.S. Application Data

(63) Continuation of application No. 16/441,565, filed on Jun. 14, 2019, now abandoned, which is a continuation of application No. 15/802,157, filed on Nov. 2, 2017, now Pat. No. 10,323,904.

(60) Provisional application No. 62/416,182, filed on Nov. 2, 2016.

(51) Int. Cl.
| | |
|---|---|
| *F41G 3/14* | (2006.01) |
| *F41G 3/16* | (2006.01) |
| *H04N 5/225* | (2006.01) |
| *F41G 11/00* | (2006.01) |
| *H04N 5/232* | (2006.01) |
| *H04N 5/63* | (2006.01) |

(52) U.S. Cl.
CPC ............ *F41G 3/165* (2013.01); *F41G 3/145* (2013.01); *F41G 11/001* (2013.01); *H04N 5/2256* (2013.01); *H04N 5/2257* (2013.01); *H04N 5/23293* (2013.01); *H04N 5/63* (2013.01)

(58) Field of Classification Search
CPC .................................. F41G 3/145; F41G 3/146
USPC ........................... 42/114, 115, 146; 89/41.05
See application file for complete search history.

(56) References Cited

U.S. PATENT DOCUMENTS

| | | | |
|---|---|---|---|
| 10,323,904 B1 * | 6/2019 | Batten ...................... | F41G 3/145 |
| 2013/0333266 A1 * | 12/2013 | Gose ...................... | G01J 1/0466 |
| | | | 42/111 |
| 2019/0301833 A1 * | 10/2019 | Campbell .................. | F41J 5/10 |

* cited by examiner

*Primary Examiner* — Bret Hayes
(74) *Attorney, Agent, or Firm* — Brian S. Steinberger; Hilary F. Steinberger; Law Offices of Brian S. Steinberger, P.A.

(57) ABSTRACT

Devices, systems and methods for providing firearms, including handguns, with infrared sights and a camera which can be held in one shooter's hand. The camera can send live video which can display a target to a portable display, such as a smart phone, smart watch or smart glasses, that is held in another hand of the shooter, so that the shooter remains out of harms' way if the target is armed.

13 Claims, 23 Drawing Sheets

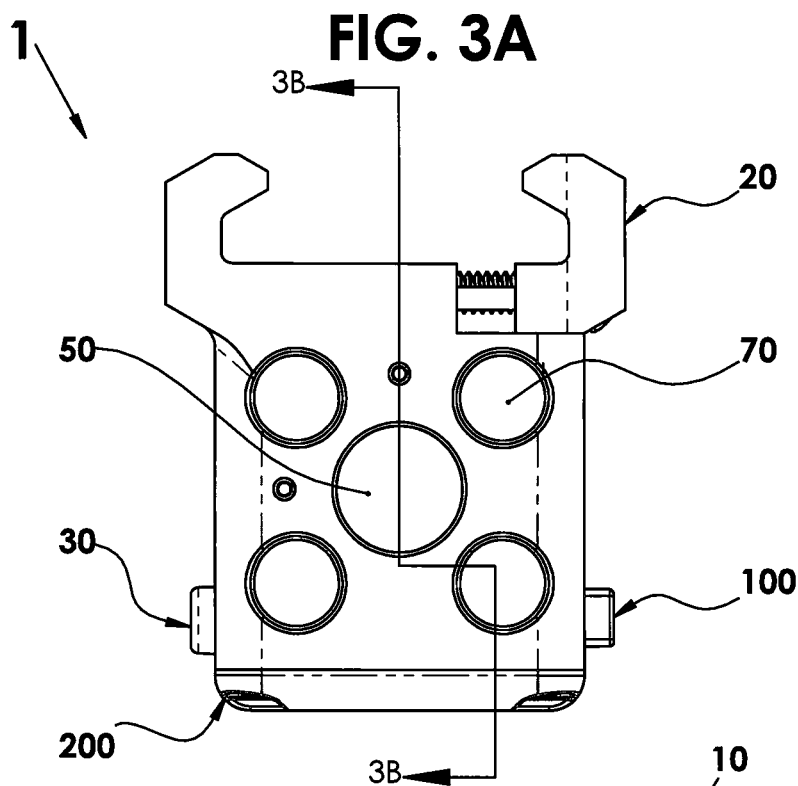
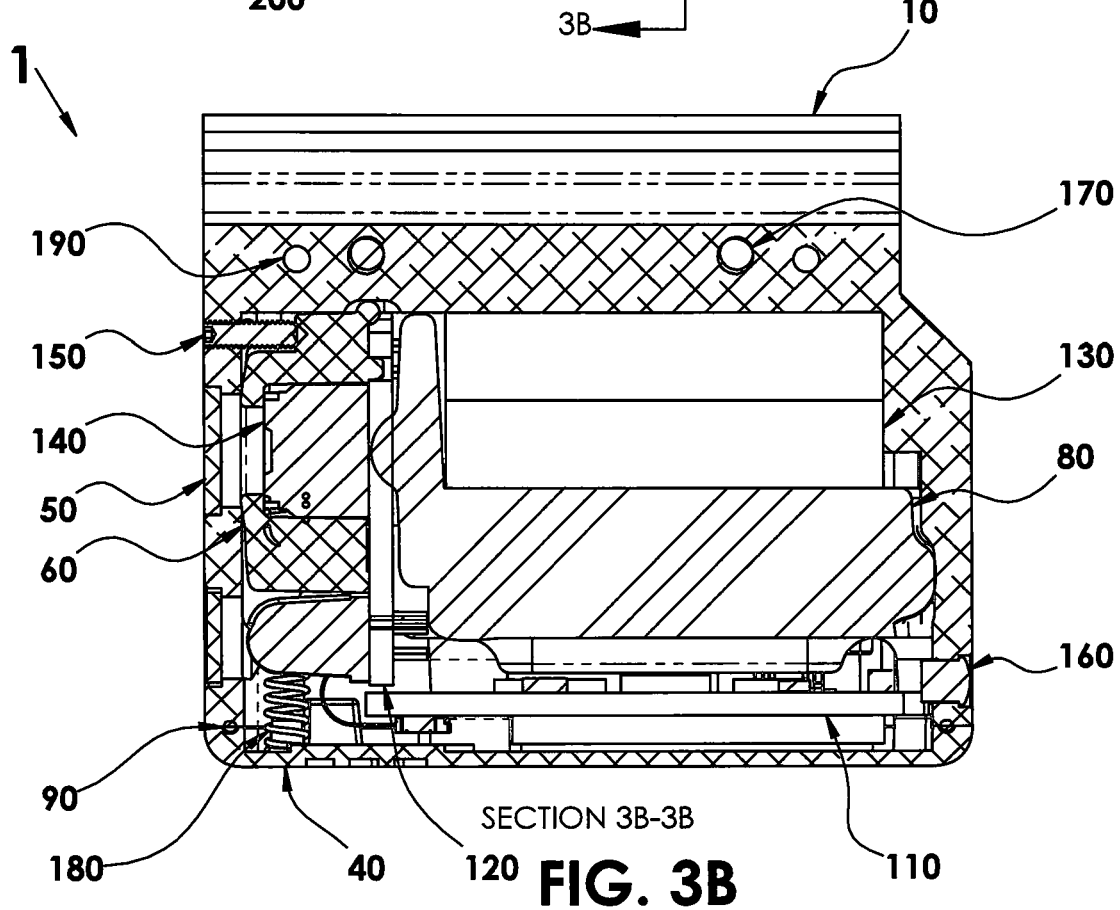

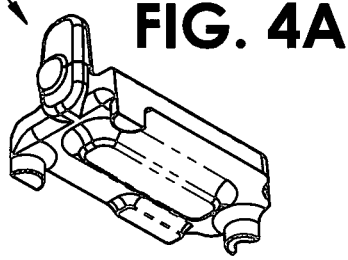
FIG. 4A
FIG. 4B
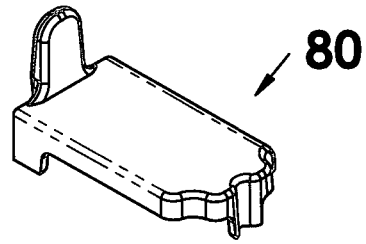
FIG. 4C
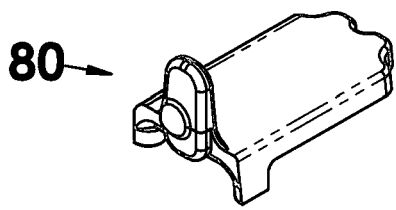
FIG. 4D
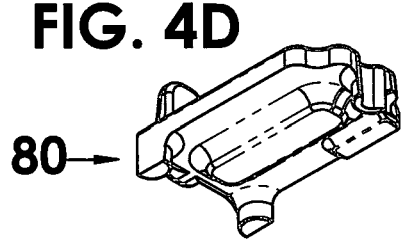
FIG. 4E 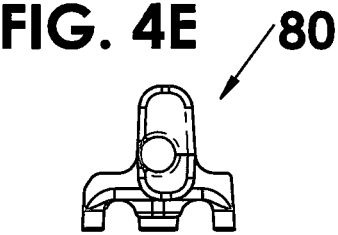 FIG. 4F 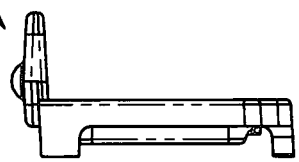 FIG. 4G 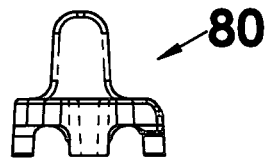
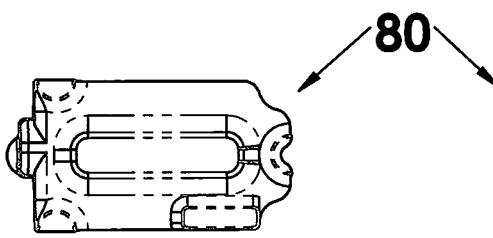
FIG. 4H  FIG. 4I

FIG. 5A
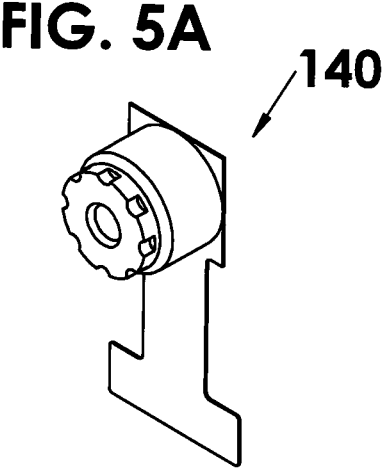
FIG. 5B
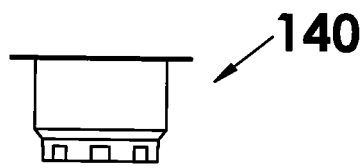
FIG. 5C  FIG. 5E  FIG. 5D
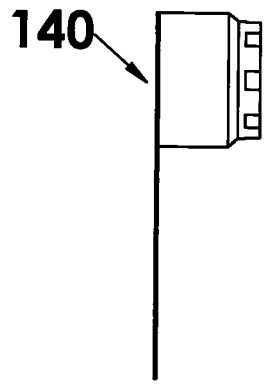 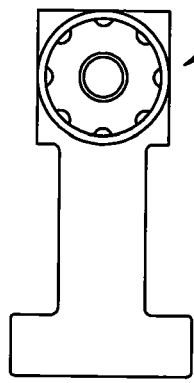 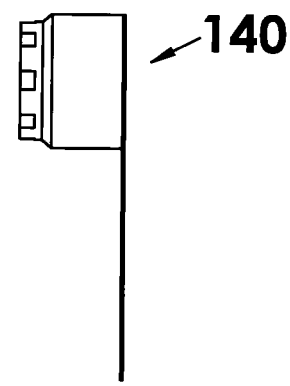

FIG. 7B
FIG. 7A
FIG. 7C
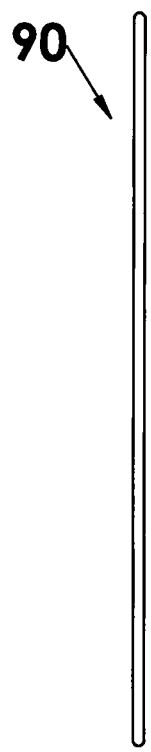
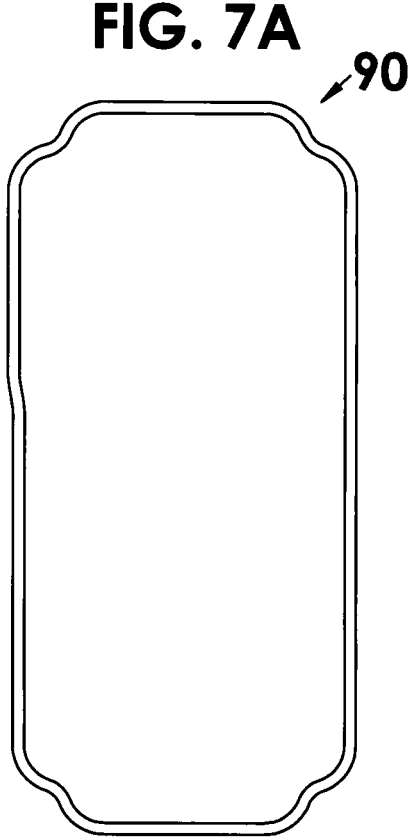
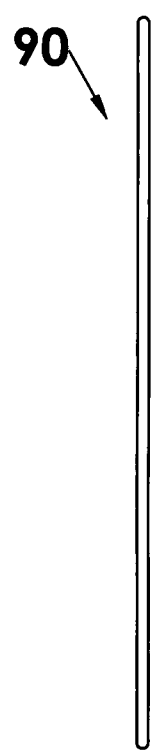
FIG. 7D

FIG. 8A
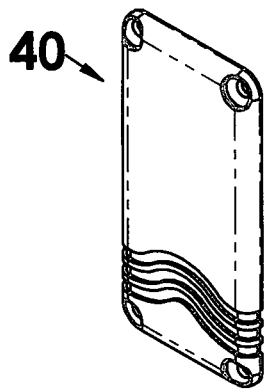
FIG. 8B
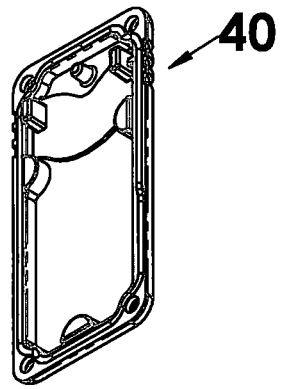
FIG. 8D
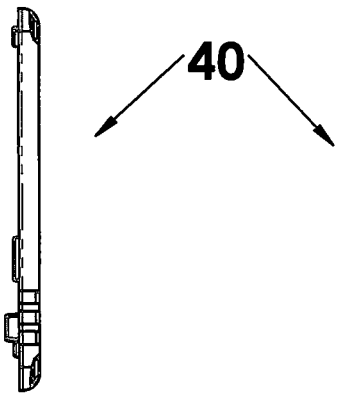
FIG. 8C
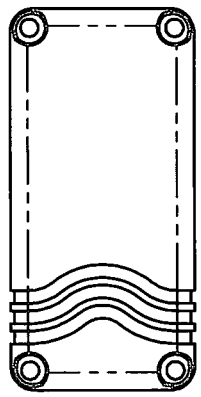
FIG. 8E
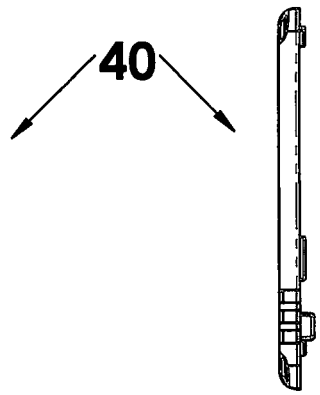
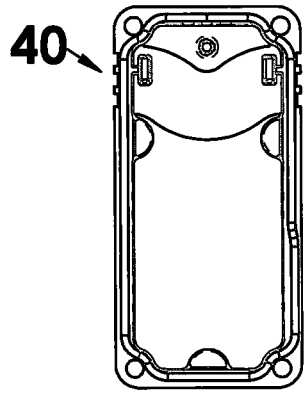
FIG. 8F
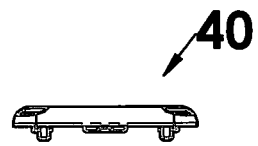
FIG. 8G

FAE MAIN ASSY (View from Top Side)

FAE MAIN ASSY (View from Top Side)

FIG. 10A

| Designator | Qty | MFG | MPN |
|---|---|---|---|
| C1,C2,C3,C4,C5,C6,C7,C8,C13,C14,C15,C17,C18,C22,C32,C33,C34,C35,C36,C39,C40,C42,C43,C44,C45,C46,C47,C48,C49 | 29 | MURATA | GRM155R61A104KA01D |
| C9,C20 | 2 | TDK CORPORATION | CGB2A1X5R1E105K033BC |
| C10,C11 | 2 | KEMET | C0402C689C5GACTU |
| C12,C24,C25,C26,C28,C29,C30,C31 | 8 | SAMSUNG | CL05A106MP5NUNC |
| C16,C19,C23,C37,C38,C50 | 6 | TAIYO YUDEN | LMK105BJ225MV-F |
| C21,C27,C41 | 3 | TDK CORPORATION | C1005X5R1A475M050BC |
| D1,D2 | 2 | LITTLEFUSE | V5.5MLA0402NR |
| FB1 | 1 | LAIRD-SIGNAL INTEGRITY PRODUCTS | H10603P600R-10 |
| J1 | 1 | MOLEX | 0512812494 |
| J5 | 1 | AMPHENOL FCI | 10118192-0001LF |
| L1,L2.L3 | 3 | TDK CORPORATION | MLZ1608A2R2M |
| LED1 | 1 | SUNLED | XZMDKDGCBD56W |
| R1,R2,R10,R11 | 4 | PANASONIC | ERJ-2RKF4701X |
| R3,R18 | 2 | YAGEO | RC0402FR-0775KL |
| R4 | 1 | PANASONIC | ERJ-2RKF1004X |
| R5,R8,R9,R17 | 4 | VISHAY/DALE | CRCW040210K0FKED |
| R6,R7,R19 | 3 | PANASONIC | ERJ-2GE0R00X |
| R12,R13,R14 | 3 | Panasonic | ERJ-2RKF1001X |
| R15 | 1 | PANASONIC | ERJ-2GE0R00X |
| R16 | 1 | Panasonic | ERJ-38WFR050V |
| R20 | 1 | KOA | RK73H1ETP1000F |
| R21 | 1 | PANASONIC | ERJ-2RKF3011X |
| R22,R23 | 2 | YAGEO | RC0402FR-0728RL |

FIG. 10B

| | | | |
|---|---|---|---|
| RT1 | 1 | Panasonic Electronic Components | ERT-J0EM103J |
| SW1 | 1 | E-SWITCH | TL1014BF160QG |
| TP15 | 1 | KEYSTONE | 5017 |
| U1 | 1 | SONIX | SN9C292BIG |
| U2 | 1 | Espressif | ESP-WROOM-32 |
| U3 | 1 | Macronix | MX25L1006EZUI-10G |
| U4 | 1 | STMicroelectronics | STM32F723ZEI6 |
| U5 | 1 | KINGSTON | EMMC04G-S627-X02U |
| U6 | 1 | LINEAR | LTC2941#TRMPBF |
| U7 | 1 | Texas Instruments | TPS65217ARSLT |
| X1 | 1 | ABRACON | ABM10-166-12.000MHZ-T3 |
| X2 | 1 | Abracon | ASCO-25.000MHZ-EK-T3 |

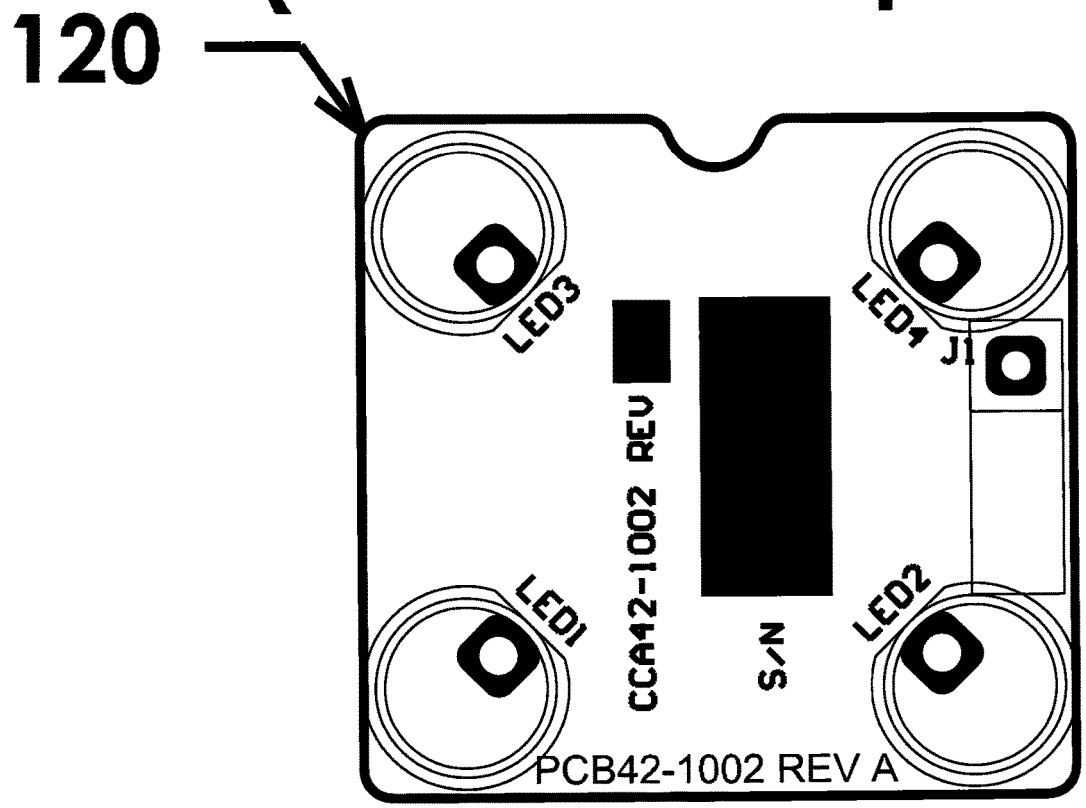

FAE LED ASSY (View from Top Side)

FIG. 12 - FAE LED REV A

| Designator | Qty | Description | MFG | MPN |
|---|---|---|---|---|
| C1 | 1 | CAPACITOR CER 0.10UF 10V X5R 0402 | MURATA | GRM155R61A104KA01D |
| C2,C4 | 2 | CAP CER 10UF 10V X5R 0402 | SAMSUNG | CL05A106MP5NUNC |
| C3 | 1 | CAPACITOR CER 1UF 25V X5R 0402 | TDK CORPORATION | CGB2A1X5R1E105K0338C |
| D1 | 1 | DIODE SCHOTTKY 30V 100MA SOD323 | Micro Commercial | SD107WS-TP |
| D2 | 1 | DIODE SCHOTTKY 40V 500MA 1206 | AVX | SD1206S040S0R5 |
| L1 | 1 | IND FIXED 4.7UH 620MA 500 MOHM | SAMSUNG | C1G10W4R7MNC |
| LED1, LED2, LED3, LED4 | 4 | LED EMITTER IR 950NM 100MA RADIAL | OSRAM Opto Semiconductors Inc. | SFH 4545 |
| R1 | 1 | RESISTOR 0 OHM 1/10W 0402 | PANASONIC | ERJ-2GE0R00X |
| R2 | 1 | RESISTOR 100K OHM 1% 1/16W 0402 | VISHAY/DALE | CRCW0402100KFKED |
| R3 | 1 | RES 0.51 OHM 1/16W 1% 0402 SMD | YAGEO | RL0402FR-070R51L |
| U1 | 1 | IC LED DRIVER RGLTR DIM TSOT23-6 | Texas Instruments | LM3405AXMK/NOPB |

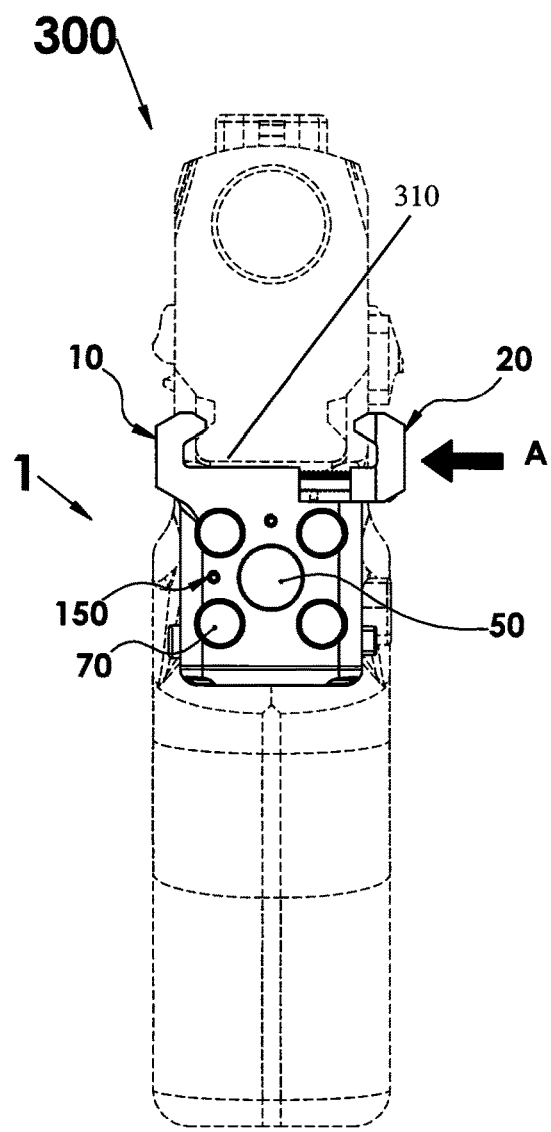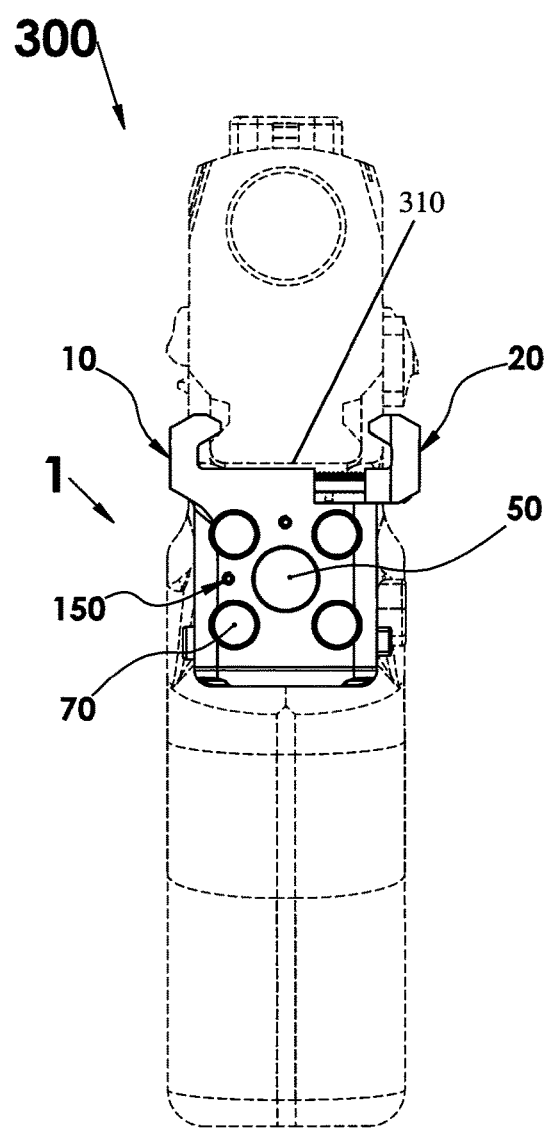
(Prior to clamping)
FIG. 13A
(Clamped)
FIG. 13B

GUNEYE Application Installation

GUNEYE Initial Setup Flow

GUNEYE Flow Diagram

INFRARED FIREARM SIGHT CAMERA ATTACHMENT, SYSTEM AND METHOD

CROSS REFERENCE TO RELATED APPLICATIONS

This application is a Continuation Patent Application of U.S. patent application Ser. No. 16/441,565 filed Jun. 14, 2019, now abandoned, which is a Continuation Patent Application of U.S. patent application Ser. No. 15/802,157 filed Nov. 2, 2017, now U.S. Pat. No. 10,323,904, which claims the benefit of priority to U.S. Provisional Application Ser. No. 62/416,182 filed Nov. 2, 2016. The entire disclosure each of the applications listed in this paragraph are incorporated herein by specific reference thereto.

FIELD OF INVENTION

This invention relates to firearm sights, and in particular to devices, systems and methods for providing firearms, including handguns, with infrared sights and a camera which can wirelessly display a target to a portable display, such as a smart phone, smart watch or smart glasses, so that the body of the shooter remains out of harms' way.

BACKGROUND AND PRIOR ART

Firearm sights allow for light sources such as a light emitting diode to be attached to a firearm, which places a dot on a target. However, there are problems with these devices, since they generally require the shooter be out in the open.

This problem is compounded when the shooter's target is also armed with a firearm. While the shooter is aiming at the armed target, the shooter becomes exposed to the armed target, which can be extremely dangerous since the armed target can fire back putting the shooter in harm's way.

Thus, the need exists for solutions to the above problems with the prior art.

SUMMARY OF THE INVENTION

A primary objective of the present invention is to provide devices, systems and methods for providing firearms, including handguns, with infrared sights and a camera which can display a target to a portable display, such as a smart phone, smart watch or smart glasses, so that the shooter remains out of harms' way.

A secondary objective of the present invention is to provide devices, systems and methods for providing firearms with infrared sights and a camera, so that a shooter can safely fire their weapon around corners or behind safe obstructions by only exposing their hand to an armed target.

The novel IR LED camera targeting system can attach to weapons using common rail systems.

The novel attachment housing can have internal and/or a removable battery. The IR (infrared) lights can be used for both low light and night vision applications.

The IR LED camera targeting system can provide a secure WIFI connection to a user's portable digital display device that can include a smart phone, smart watch or VR (virtual reality) glasses.

A mobile software app can provide for live streamed video feeds with a slight overlay that can allow for sight adjustments via a smart App where no adjustments are needed on the weapon for calibrating sights for a more accurate shot.

The novel system allows for firing of a firearm, such as a handgun from behind cover and around corners by only exposing the user's hand when used in conjunction with the secondary sight camera from the smart device, such as the smart phone, smart watch or VR glasses.

A target sighting system for firearms, can include a target sighting attachment for a firearm having a front facing camera and at least one front facing light source, and a wireless transmission medium for sending a live target image from the camera to another location, and a power supply for supplying power to the target sighting attachment, an attachment mechanism for attaching the target sighting attachment to a firearm, a portable power supply for providing power to the target sighting attachment, and a portable digital display device adjacent to the firearm with the target sighting attachment for displaying the target image on a display, wherein the firearm with the target sighting attachment is adapted to be held by one hand of a user while another hand of the user is adapted to support the portable digital display device.

The at least one front facing light source can include an LED (light emitting diode), with four LEDs arranged in a rectangular pattern.

The portable digital display device can include a smart phone, a smart watch, and VR (virtual reality) glasses.

The live target image can include live video streaming of the target sent by the wireless transmission to the portable digital display device.

The attachment mechanism can include clamps for clamping about rails on the firearm. The firearm can be a handgun with rail system.

The portable digital display device can include an overlay image on the display of the portable digital display device which allows for sight adjustments of the target without mechanical attachments needed on the target sighting attachment.

The target sighting attachment can include a camera adjustment adapter for adjusting position of the camera for aiming at the target.

A method of aiming a firearm at an armed target by only exposing one hand of the shooter holding the firearm to the armed target, can include the steps of providing a target sighting attachment for a firearm having a front facing camera and at least one front facing light source, attaching the target sighting attachment to a firearm, providing a portable digital display device for displaying the target image on a display, aiming the firearm with the target sighting attachment with one hand of a shooter at an armed target, supporting the portable digital display device in another hand without exposing the shooter to the armed target, and sending an image of the armed target via a wireless transmission medium from the camera to the portable digital display device. The image can be a live video stream.

The method can include the step of providing an overlay image on the display of the portable digital display device which allows for sight adjustments of the target without mechanical attachments needed on the target sighting attachment.

The method can include the step of providing a camera adjustment adapter for adjusting position of the camera for aiming at the target.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 3A is a front view of the infrared LED sight camera attachment of FIG. 1A.

FIG. 3B is a cross-sectional view of the infrared LED sight camera attachment of FIG. 3A along arrows 3B.

FIG. 4A is a lower front right perspective view of the wedge for the infrared LED sight camera attachment of FIG. 1A.

FIG. 4B is an upper rear left perspective view of the wedge of FIG. 4A.

FIG. 4C is an upper front right perspective view of the wedge of FIG. 4A.

FIG. 4D is a lower rear right perspective view of the wedge of FIG. 4A.

FIG. 4E is a front view of the wedge of FIG. 4A.

FIG. 4F is a right side view of the wedge of FIG. 4A.

FIG. 4G is a rear view of the wedge of FIG. 4A.

FIG. 4H is a bottom view of the wedge of FIG. 4A.

FIG. 4I is a top view of the wedge of FIG. 4A.

FIG. 5A is a front right perspective view of camera used in the infrared LED sight camera attachment of FIG. 1A.

FIG. 5B is a top view of the camera of FIG. 5A.

FIG. 5C is a left side view of the camera of FIG. 5A.

FIG. 5D is a right side view of the camera of FIG. 5A.

FIG. 5E is a front view of the camera of FIG. 5A.

FIG. 7A is a front view of the gasket used in the infrared LED sight camera attachment of FIG. 1A.

FIG. 7B is a left side view of the gasket of FIG. 7A.

FIG. 7C is a right side view of the gasket of FIG. 7A.

FIG. 7D is a top view of the gasket of FIG. 7A.

FIG. 8A is a front right perspective view of the cover for the infrared LED sight camera attachment of FIG. 1A.

FIG. 8B is a rear left perspective view of the cover of FIG. 8A.

FIG. 8C is a front view of the cover of FIG. 8A.

FIG. 8D is a left side view of the cover of FIG. 8A.

FIG. 8E is a right side view of the cover of FIG. 8A.

FIG. 8F is a rear view of the cover of FIG. 8A.

FIG. 8G is a top view of the cover of FIG. 8A.

FIG. 10A is a first table of the electrical components used in the main circuit card assembly of FIGS. 9A-9B.

FIG. 10B is a second table of the electrical components used in the main circuit card assembly of FIGS. 9A-9B.

FIG. 11A is an enlarged front view of the IR LED circuit card assembly for the infrared LED sight camera attachment of FIG. 1A.

FIG. 12 is a table of the electrical components used in the IR LED circuit card assembly of FIGS. 11A-11B.

FIG. 13A is a front view of the infrared LED sight camera attachment of FIG. 1A slid over rails under a barrel of a handgun firearm prior to clamping to the rails.

FIG. 13B is another view of the infrared LED sight camera attachment of FIG. 13A clamped to the rails on the firearm.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1A:
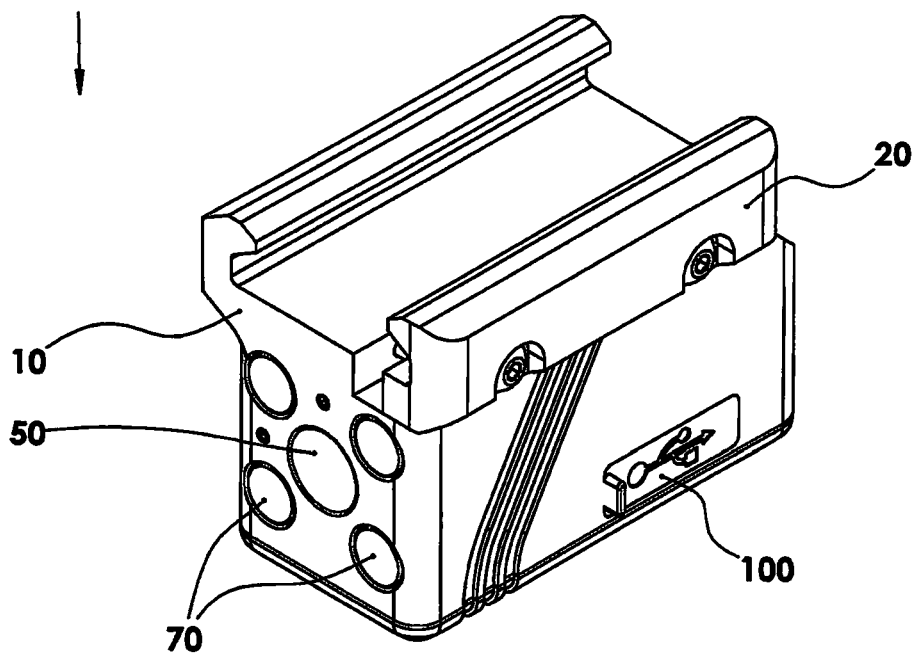
FIG. 1A is an upper front right perspective view of the infrared LED sight camera attachment for a firearm.
Figure 1B:
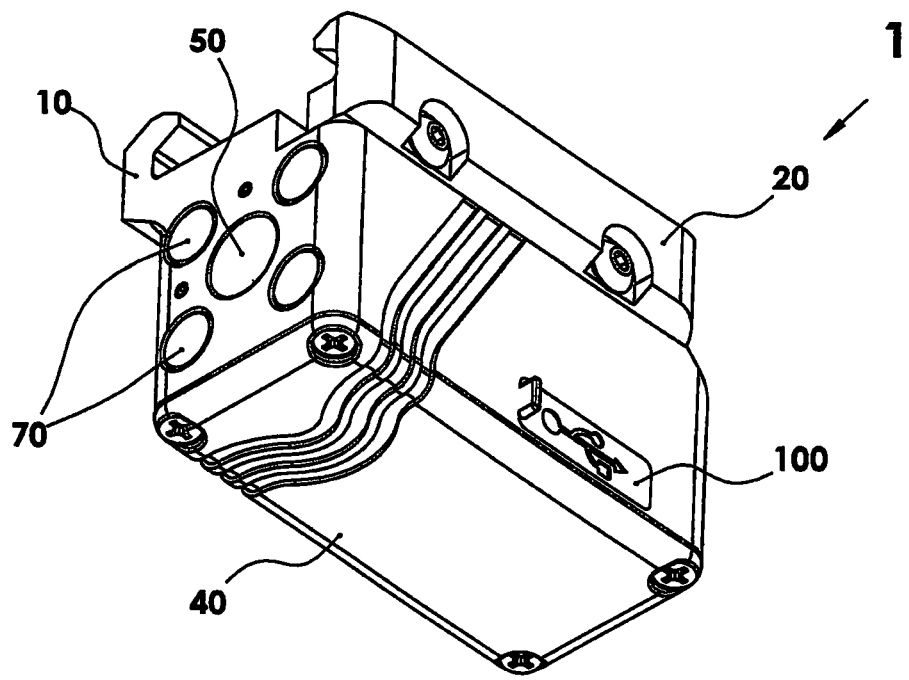
FIG. 1B is a lower front right perspective view of the infrared LED sight camera attachment of FIG. 1A.
Figure 1C:
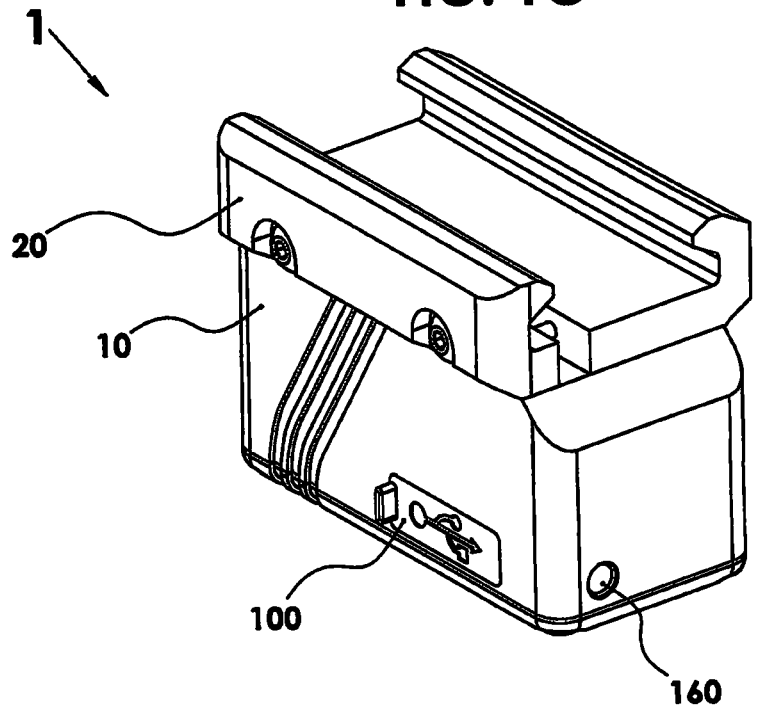
FIG. 1C is an upper rear left perspective view of the infrared LED sight camera attachment of FIG. 1A.
Figure 1D:
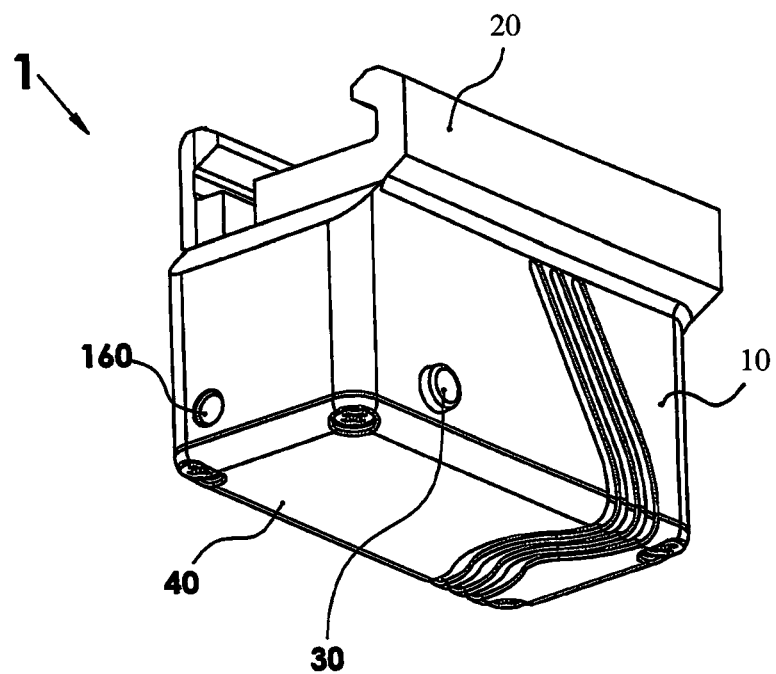
FIG. 1D is a lower rear right perspective view of the infrared LED sight camera attachment of FIG. 1A.

A list of components will now be described.
1 infrared LED sight camera attachment/device/system
10 main housing
20 moveable mounting rail(s)
30 power button
40 cover
50 lens, camera
60 camera adjustment adapter
62 tab
64 tab
70 lens for camera
80 wedge
90 gasket
100 USB cover
110 main circuit card assembly
120 IR LED circuit card assembly
130 batteries
140 camera
150 set screw for camera adjustment
160 power LED light pipe
170 mounting rail fasteners, such as screws and bolts
180 camera adjustment spring
190 mounting rail dowel pin(s)
200 cover screw
300 firearm
310 rails on firearm
400 portable digital display device
410 cross overlay for laying over target
450 target FIG. 1A is an upper front right perspective view of the infrared LED sight camera attachment 1 for a firearm. FIG. 1B is a lower front right perspective view of the infrared LED sight camera attachment 1 of FIG. 1A. FIG. 1C is an upper rear left perspective view of the infrared LED sight camera attachment 1 of FIG. 1A. FIG. 1D is a lower rear right perspective view of the infrared LED sight camera attachment 1 of FIG. 1A.

Referring to FIGS. 1A-1D, the assembled infrared LED sight camera attachment 1 can include a generally rectangular box shaped main housing 10, with a top having a pair of rails with one fixed and the other mounting rail 20 being moveable, with a front end having a camera lens 50 surrounded by a plurality of light sources 70, such as infrared (IR) light emitting diodes (LEDs) 70, back end with light pipe 160, and the bottom of the housing 10 having a removable cover 40. A power button 30 can be located on one side of the housing 10 with a USB cover 100 on the opposite side.

Figure 2:
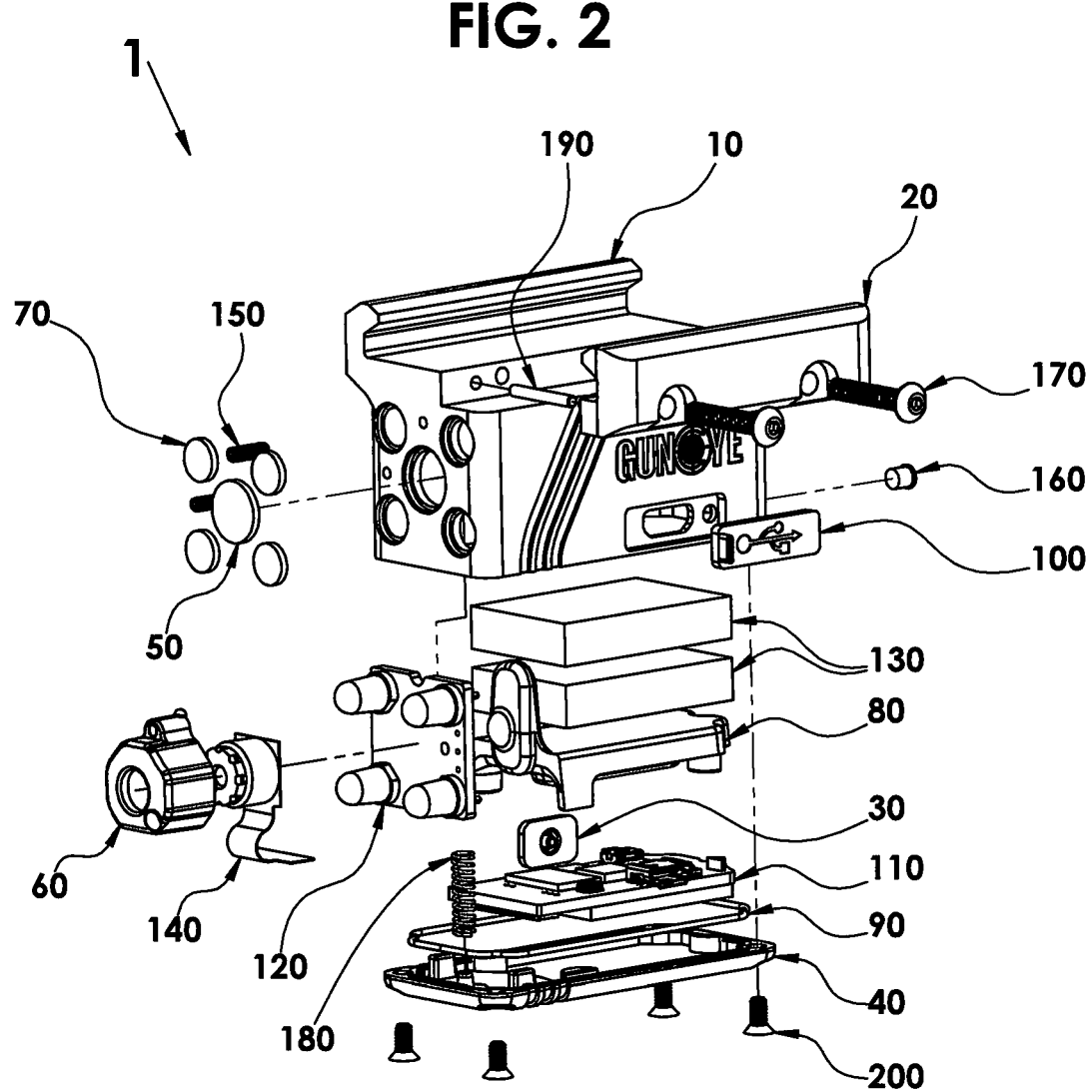
FIG. 2 is an exploded view of the infrared LED sight camera attachment of FIG. 1A.

FIG. 2 is an exploded view of the infrared LED sight camera attachment 1 of FIG. 1A.

FIG. 3A is a front view of the assembled infrared LED sight camera attachment 1 of FIG. 1A. FIG. 3B is a cross-sectional view of the infrared LED sight camera attachment 1 of FIG. 3A along arrows 3B.

Referring to FIGS. 1A-2, the moveable mounting rail 20 can move toward and away from a top side of the housing 10 by a pair of mounting rail fasteners 170, such as screws or bolts, and with mounting rail dowel pin 190.

Dowel pins can be used to align and stabilize movable mounting rail 20 during tightening and while tightened.

On the front end of the housing 10 can be four indented sockets for receiving four infrared (IR) light emitting diode (LED) lens 70 arranged in a rectangular pattern. In the middle of the lens 70 can be camera lens 50 also positioned in an indentation on the front of the housing 10.

Figure 11B:
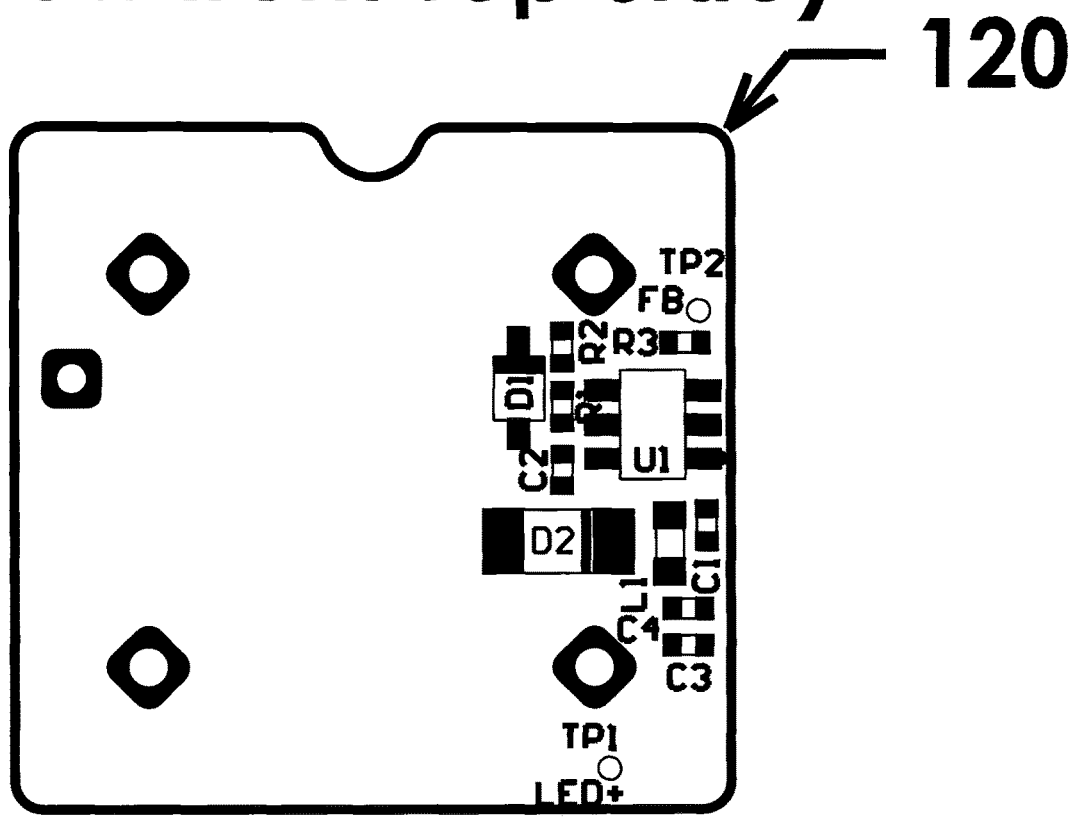
FIG. 11B is a rear view of the IR LED circuit card assembly of FIG. 11A.

An IR LED circuit card assembly 120 can be positioned behind the front wall of the housing 10, which is shown in FIGS. 11A, 11B and 12. A camera chip on the circuit board assembly is monitored for ambient light level and during low light conditions it automatically switches the camera to monitor and stream only Infrared light spectrum video and switches on the IR LED circuit for low light illumination, down to and including total darkness.

A camera adjustment adapter 60 also be positioned behind the front wall of the housing 10 with a camera 140 sandwiched between the IR LED circuit card assembly 10. Set screws 150 can be used for adjustment of the camera 140. The camera 140 is shown more clearly in FIGS. 5A-5D. A camera adjustment spring 180 sits on a top of cover 40. The camera adjustment adapter 60 with tabs 62, 64 is shown more clearly in FIGS. 6A-6G.

The camera chip/lens configuration has a set field of view to optimize the size of the image on smart device, etc for better target identification/clarity.

It is also devoid of the standard IR filter to allow IR viewing and streaming of IR spectrum video. Camera clarity can also be controlled by electronic auto-focus.

The windage (horizontal) and elevation (vertical) adjustment screws 150 in tabs 62, 64 can adjust the camera 140 to align point of impact with smart device chosen reticle superimposed on the screen. The springs dampen the camera unit and hold tension to hold the camera in position set by turning the screws in either a clockwise or counter clockwise to align.

A pair of replaceable batteries 130 can be supported inside of the housing 10 by wedge 80. The replaceable batteries can be recharged by plugging a charging micro USB charger (phone/tablet/etc) into the port under the rubber boot which is the USB cover 100. This port can also allow for downloading of stored video on device, less audio. (audio only recorded on smart device).

Removable fasteners 200, such as screws and bolts, can be used to attach and detach the cover 40 from the open bottom of the housing 10, with a gasket 90 therebetween. The gasket is further shown in FIGS. 7A-7D, and cover 40 is further shown in FIGS. 8A-8G. There are no "end user" serviceable parts inside the unit. Gasket 90 can be a pliable rubber or elastomer type material that can provide a water type seal for the cover 40 when it is attached by the fasteners 200 to the bottom of the housing 10.

A main circuit card assembly 110 can be positioned beneath the wedge 80, and is further shown in relation to FIGS. 9A-10B. The USB cover 100 protects port from moisture and dust/dirt.

To download video files from the assembled infrared LED sight camera attachment (unit) 1, a user can connect a line, such as a micro USB data cable to device and standard USB end of cable to personal computer (PC) or MAC. The unit will show up similar to a thumb/flash drive. Next, the user can download or view files on the PC or MAC. Generally, the assembled infrared LED sight camera attachment 1 will NOT have audio. The App referenced in FIGS. 16, 17 and 18 can be set in settings to automatically save video and audio to a portable digital device 400, such as a smart phone, smart watch or virtual reality glasses, and the like.

The power LED pipe 160 is a fiber optic tube to transfer multicolor LED signal from the main circuit board to be visible on rear of the unit by user only.

FIG. 4A is a lower front right perspective view of the wedge 80 for the infrared LED sight camera attachment 1 of FIG. 1A. FIG. 4B is an upper rear left perspective view of the wedge 80 of FIG. 4A. FIG. 4C is an upper front right perspective view of the wedge 80 of FIG. 4A. FIG. 4D is a lower rear right perspective view of the wedge 80 of FIG. 4A. FIG. 4E is a front view of the wedge 80 of FIG. 4A. FIG. 4F is a right side view of the wedge 80 of FIG. 4A. FIG. 4G is a rear view of the wedge 80 of FIG. 4A. FIG. 4H is a bottom view of the wedge 80 of FIG. 4A. FIG. 4I is a top view of the wedge 80 of FIG. 4A.

Referring to FIGS. 1A-4I, the wedge 80 is used to support the batteries 130 inside the upper part of the housing 10. The wedge 80 also can be used to protect and separate the batteries 130 from the circuit boards 110, 120 to dampen recoil damage and/or thermal insulation.

FIG. 5A is a front right perspective view of camera 140 used in the infrared LED sight camera attachment of 1 FIG. 1A. FIG. 5B is a top view of the camera 140 of FIG. 5A. FIG. 5C is a left side view of the camera 140 of FIG. 5A. FIG. 5D is a right side view of the camera 140 of FIG. 5A. FIG. 5E is a front view of the camera 140 of FIG. 5A.

Figure 6A:
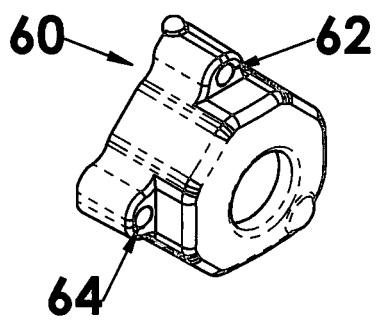
FIG. 6A is an upper front left perspective view of the camera adjustment adapter used in the infrared LED sight camera attachment of FIG. 1A.
Figure 6B:
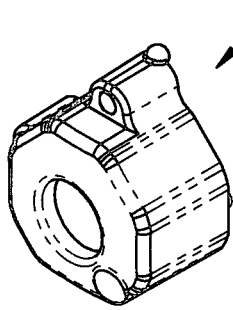
FIG. 6B is an upper front right perspective view of the camera adjustment adapter of FIG. 6A.
Figure 6C:
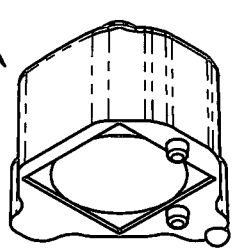
FIG. 6C is a lower rear perspective view of the camera adjustment adapter of FIG. 6A.
Figure 6D:
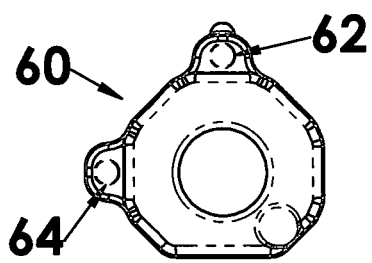
FIG. 6D is a front view of the camera adjustment adapter of FIG. 6A.
Figure 6E:
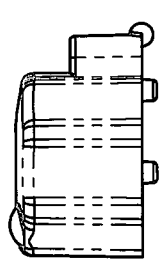
FIG. 6E is a right side view of the camera adjustment adapter of FIG. 6A.
Figure 6F:
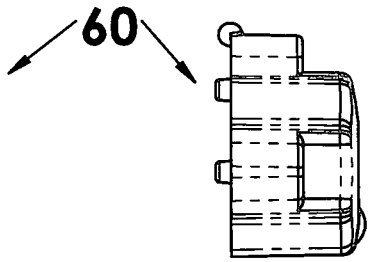
FIG. 6F is a left side view of the camera adjustment adapter of FIG. 6A.
Figure 6G:
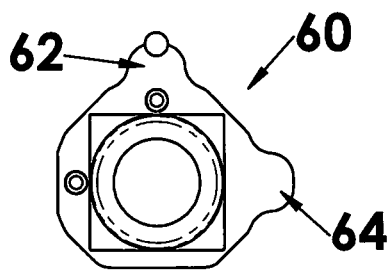
FIG. 6G is a rear side view of the camera adjustment adapter of FIG. 6A.

FIG. 6A is an upper front left perspective view of the camera adjustment adapter 60 with tabs 62, 64 used in the infrared LED sight camera attachment 1 of FIG. 1A. FIG. 6B is an upper front right perspective view of the camera adjustment adapter 60 of FIG. 6A. FIG. 6C is a lower rear perspective view of the camera adjustment adapter 60 of FIG. 6A. FIG. 6D is a front view of the camera adjustment adapter 60 of FIG. 6A. FIG. 6E is a right side view of the camera adjustment adapter 60 of FIG. 6A. FIG. 6F is a left side view of the camera adjustment adapter 60 of FIG. 6A. FIG. 6G is a rear side view of the camera adjustment adapter 60 of FIG. 6A.

FIG. 7A is a front view of the gasket 90 used in the infrared LED sight camera attachment 1 of FIG. 1A. FIG. 7B is a left side view of the gasket 90 of FIG. 7A. FIG. 7C is a right side view of the gasket 90 of FIG. 7A. FIG. 7D is a top view of the gasket 90 of FIG. 7A.

FIG. 8A is a front right perspective view of the cover 40 for the infrared LED sight camera attachment 1 of FIG. 1A. FIG. 8B is a rear left perspective view of the cover 40 of FIG. 8A. FIG. 8C is a front view of the cover 40 of FIG. 8A. FIG. 8D is a left side view of the cover 40 of FIG. 8A. FIG. 8E is a right side view of the cover 40 of FIG. 8A. FIG. 8F is a rear view of the cover 40 of FIG. 8A. FIG. 8G is a top view of the cover 40 of FIG. 8A. The cover 40 can also made of a polymer material instead of aluminum or any other metal to allow for better WIFI/BLUETOOTH connection.

Figure 9A:
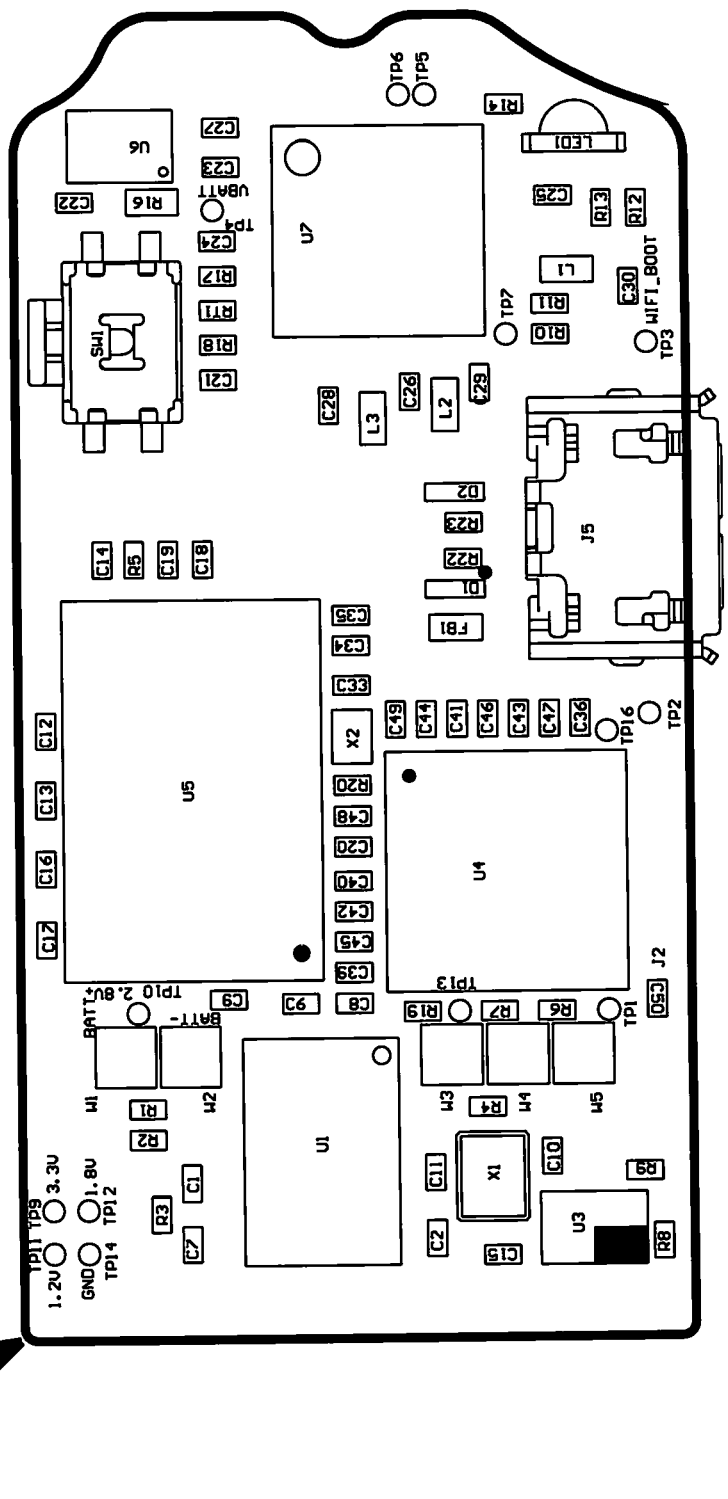
FIG. 9A is an enlarged top view of the main circuit card assembly used in the infrared LED sight camera attachment of FIG. 1A.
Figure 9B:
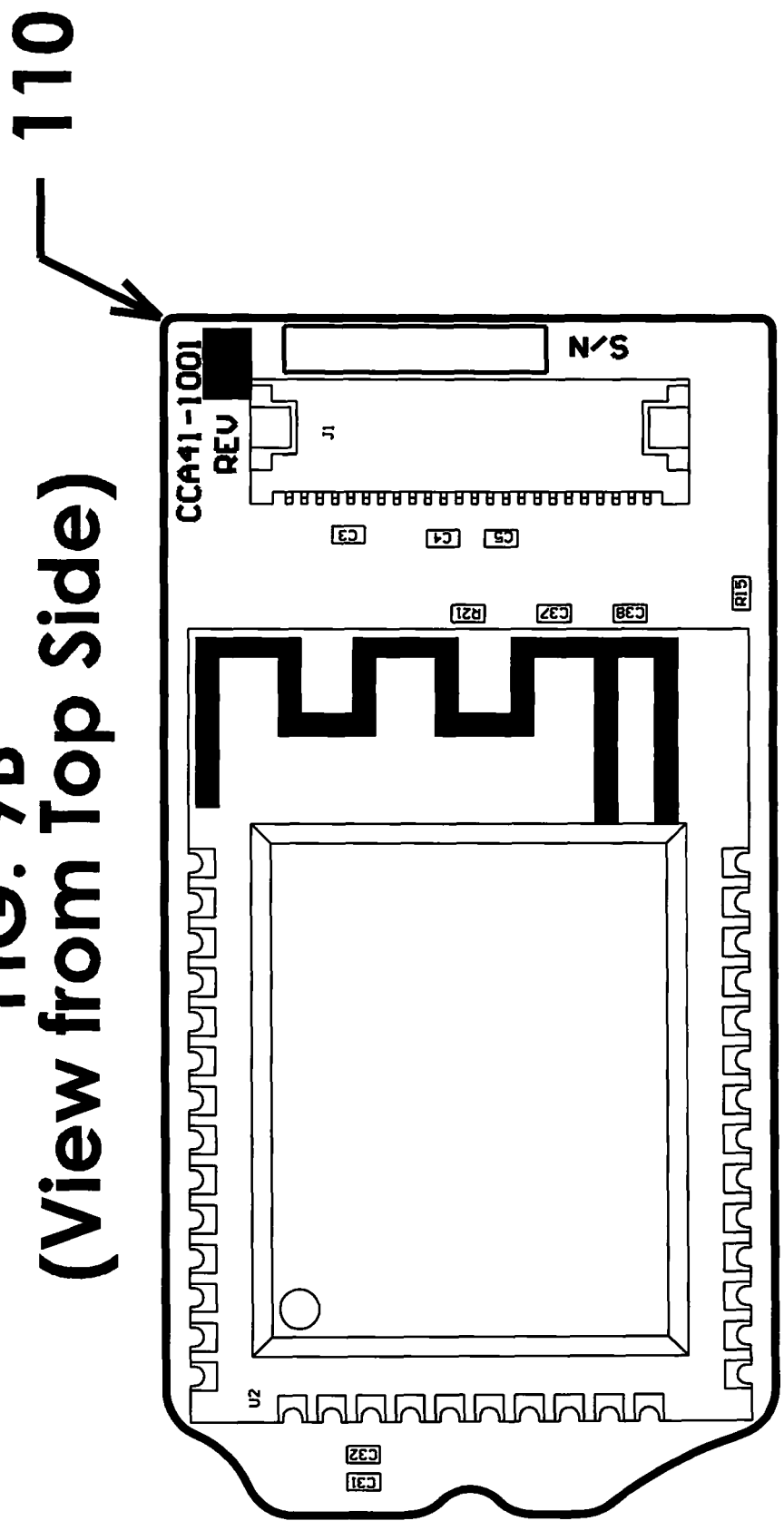
FIG. 9B is a bottom view of the main circuit card assembly of FIG. 8A.

FIG. 9A is an enlarged top view of the main circuit card assembly 110 used in the infrared LED sight camera attachment 1 of FIG. 1A. FIG. 9B is a bottom view of the main circuit card assembly 110 of FIG. 8A.

FIG. 10A is a first table of the electrical components used in the main circuit card assembly 110 of FIGS. 9A-9B. FIG. 10B is a second table of the electrical components used in the main circuit card assembly 110 of FIGS. 9A-9B.

FIG. 11A is an enlarged front view of the IR LED circuit card assembly 120 for the infrared LED sight camera attachment 1 of FIG. 1A. FIG. 11B is a rear view of the IR LED circuit card assembly 120 of FIG. 11A.

FIG. 12 is a table of the electrical components used in the IR LED circuit card assembly 120 of FIGS. 11A-11B.

FIG. 13A is a front view of the infrared LED sight camera attachment 1 of FIG. 1A slid over rails 310 under a barrel of a handgun firearm 300 prior to clamping to the rails 310. The firearm 300 can include a handgun revolver, semi-automatic handgun, and the like.

FIG. 13B is another view of the infrared LED sight camera attachment 1 of FIG. 13A clamped to the rails 310 on the firearm 300 by moving the moveable mounting rail 20 onto the rails 310 on the handgun 300.

Figure 14A:
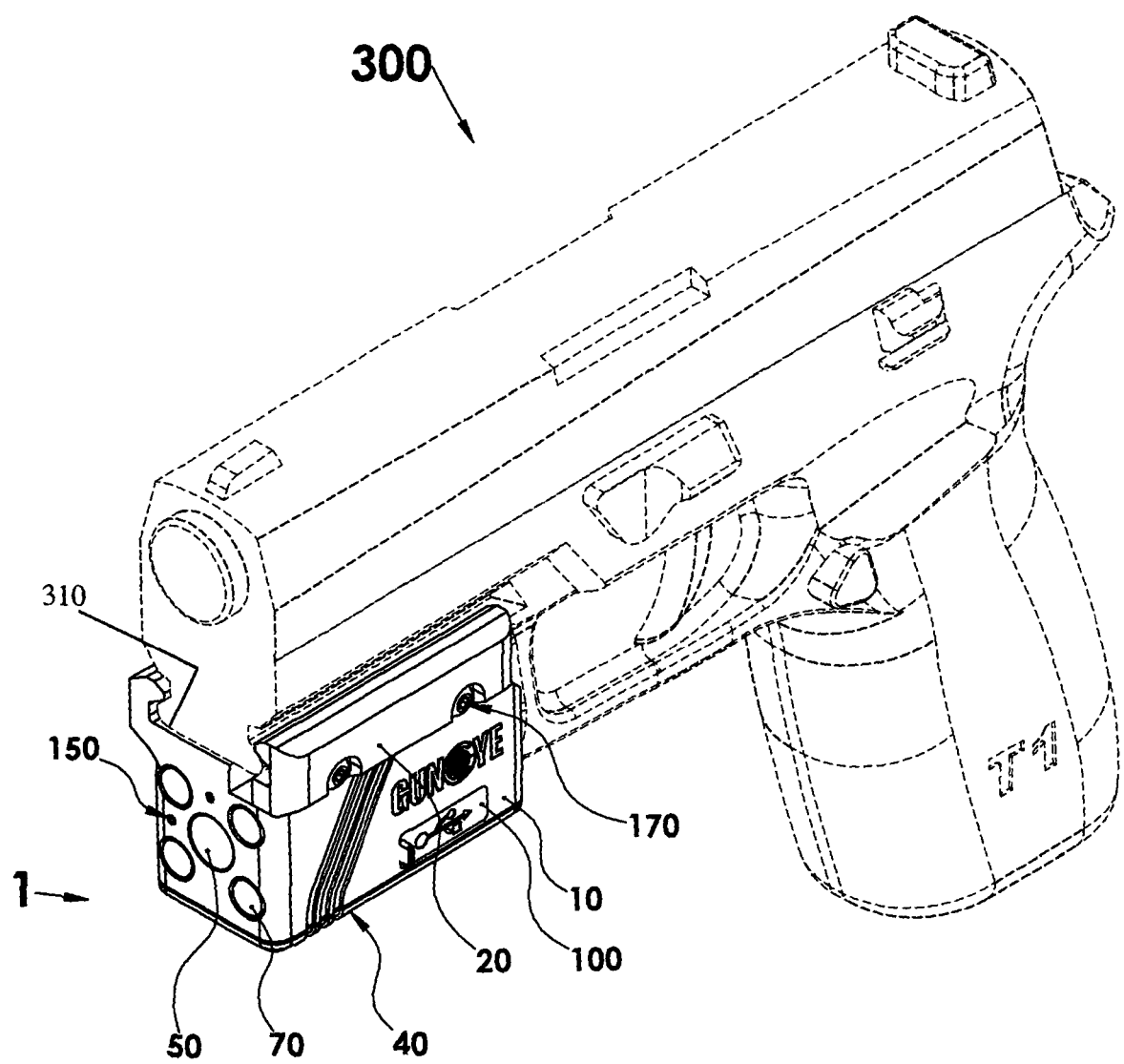
FIG. 14A is a right perspective view of FIGS. 13A-13B of the firearm with clamped infrared LED sight camera attachment.
Figure 14B:
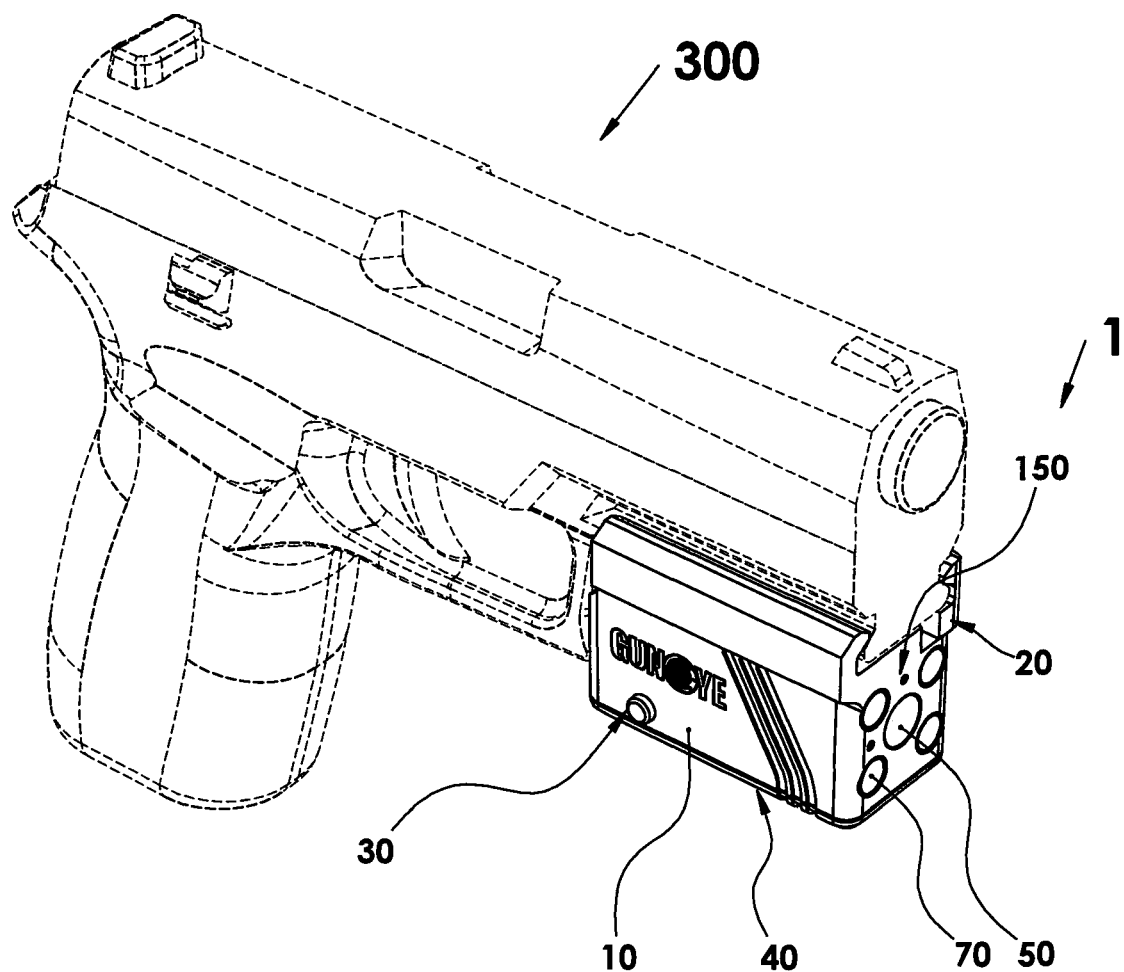
FIG. 14B is a left perspective view of the firearm with clamped infrared LED sight camera attachment of FIG. 14A.

FIG. 14A is a right perspective view of FIGS. 13A-13B of the firearm 300 with clamped infrared LED sight camera attachment 1. FIG. 14B is a left perspective view of the firearm 300 with clamped infrared LED sight camera attachment 1 of FIG. 14A.

Figure 15:
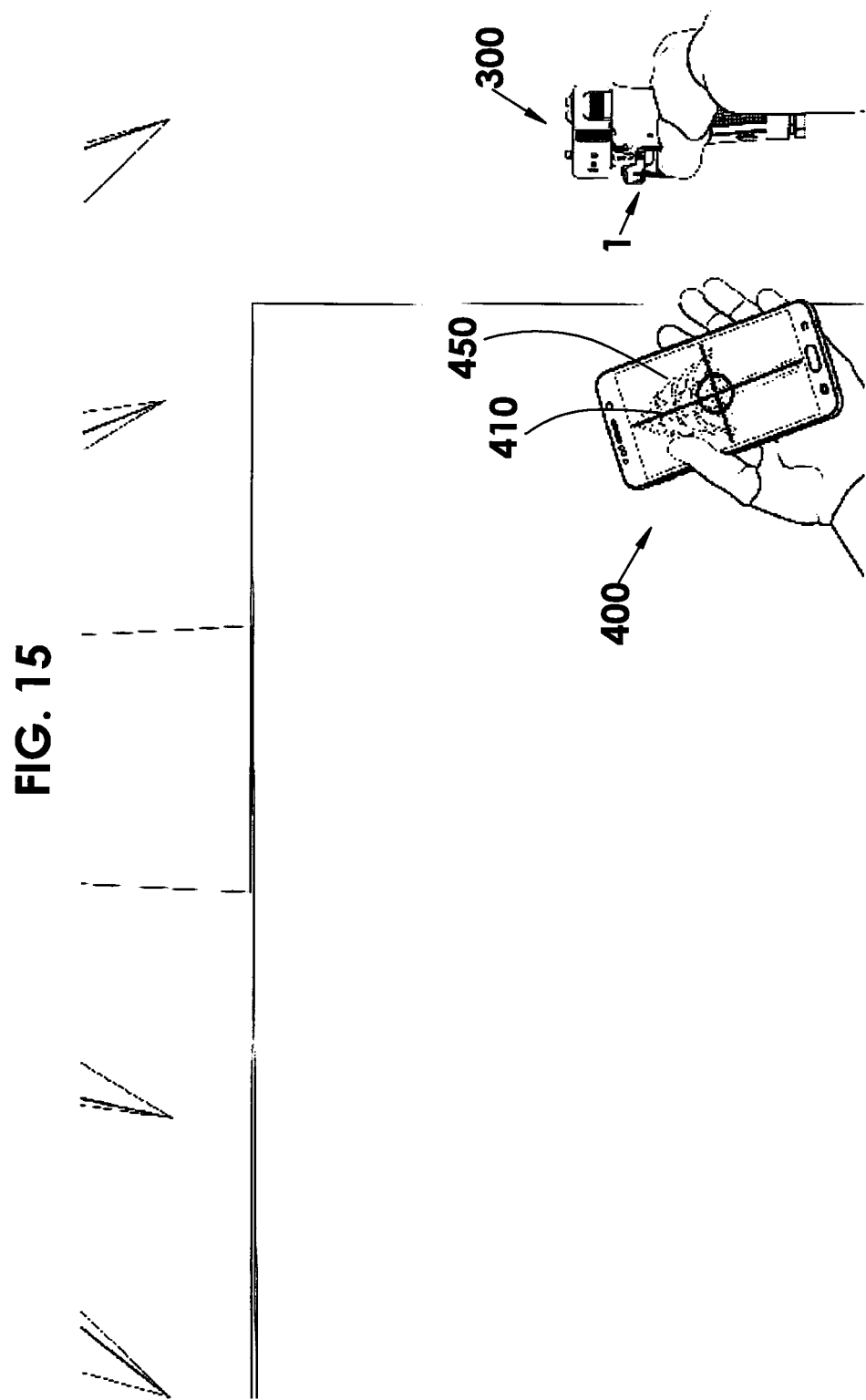
FIG. 15 shows the firearm with clamped infrared LED sight camera attachment of FIGS. 13A-14B with smart phone displaying a target while the shooter is out of the target's view.

FIG. 15 shows the firearm 300 with clamped infrared LED sight camera attachment 1 of FIGS. 13A-14B with a portable digital device 400, that can include a smart phone displaying a target 450 while the shooter holding the firearm 300 and portable digital device 400 is out of the target's view. Here, only the hand of the shooter holding the firearm 300 is exposed to an armed target. A cross hair target overlay 410 can be laid over the target 450 on the display screen of the portable digital display device 400. The Target overlay 410 can be centered on the display of the portable digital device 400 by the APP. In the settings mode, the oversized video block can be moved to align with the centered overlay. (similar to using Google map) The Oversized video block can be much larger than the screen to allow the user to basically move the picture behind the window.

When being used, the camera 140 in the infrared LED sight camera attachment can send a live feed such as a live video stream through a wireless medium, such as but not limited to WIFI/BLUETOOTH to the portable digital display device.

Figure 16:
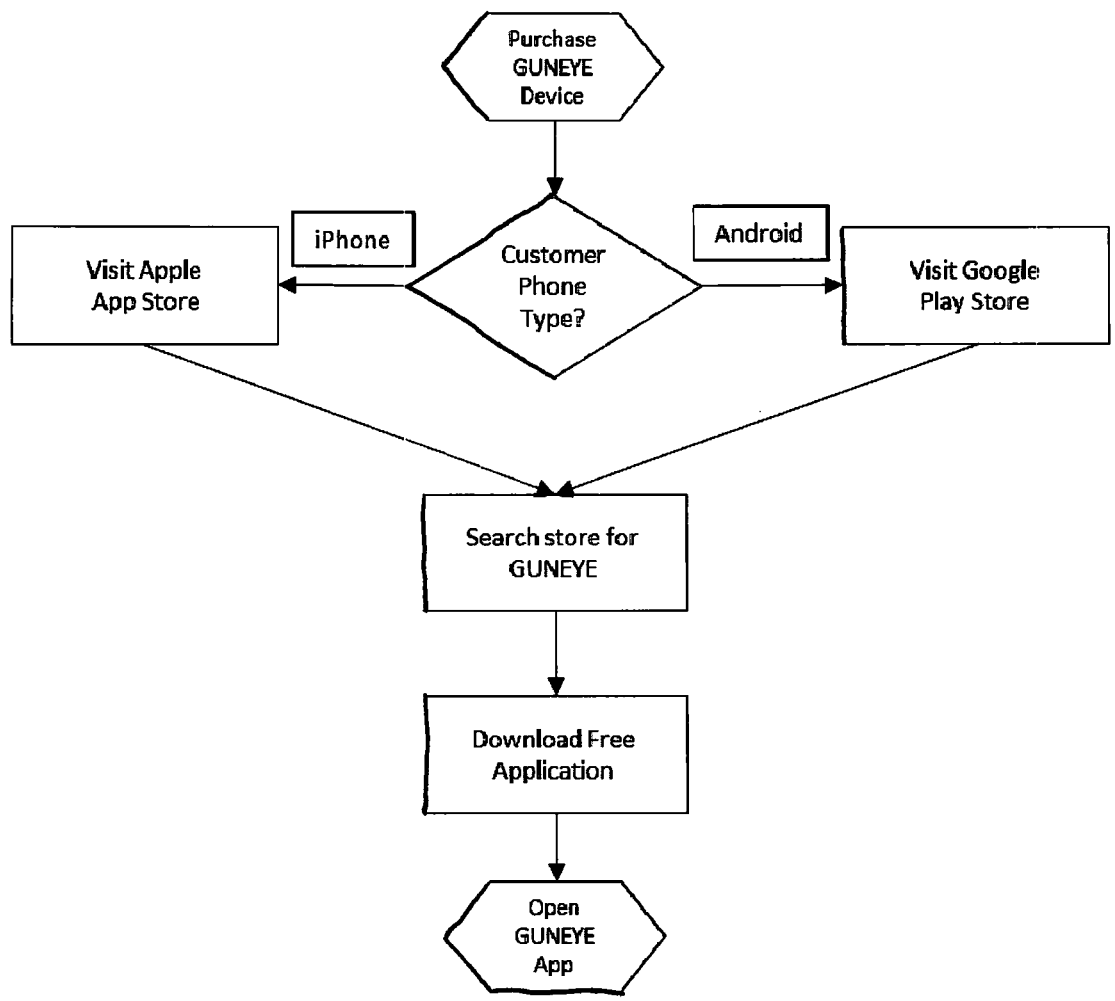
FIG. 16 is a flowchart of the app being installed on a smart phone shown in FIG. 15.

FIG. 16 is a flowchart of the app being installed on a smart phone shown in FIG. 15. An App having software can be purchased through sellers such as an APPLE® App store or an App for an android smart phone purchased for example, at GOOGLE® Play Store.

Figure 17:
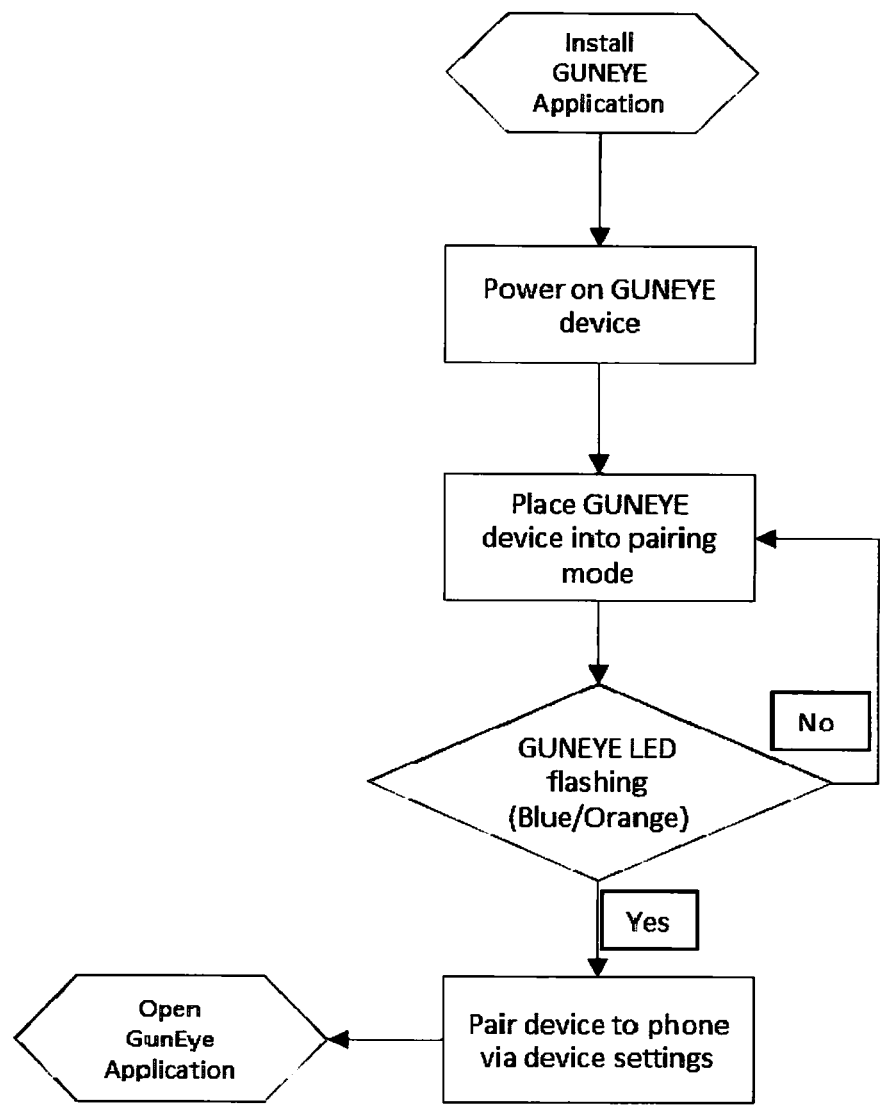
FIG. 17 is a flow chart of the initial setup of the App of FIG. 16.

FIG. 17 is a flow chart of the initial setup of the App of FIG. 16.

Figure 18:
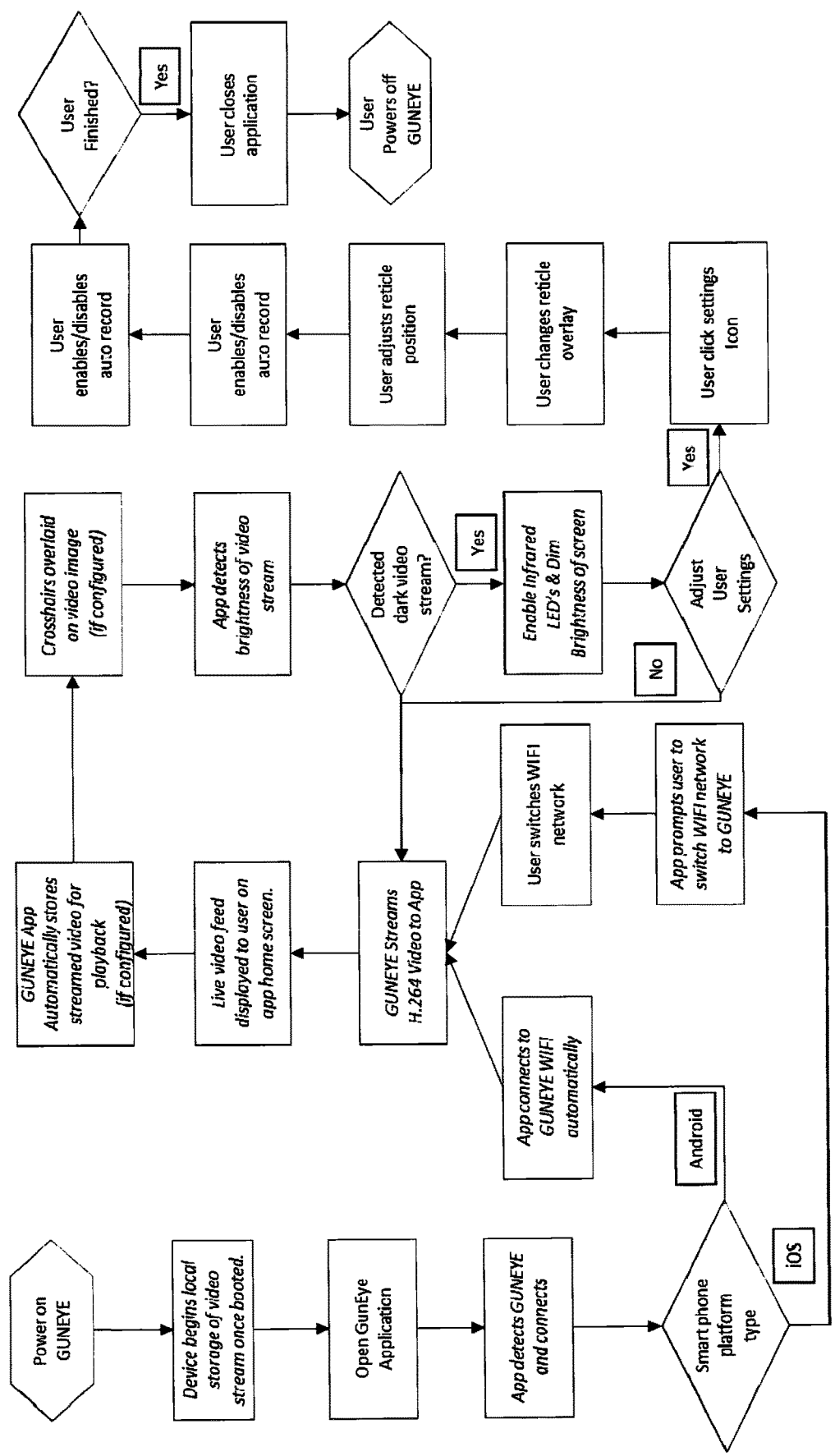
FIG. 18 is a flow chart running the App for the infrared LED sight camera attachment and smart phone of FIGS. 15-17.

FIG. 18 is a flow chart running the software App for the infrared LED sight camera attachment and smart phone of FIGS. 15-17. Although the portable digital display device is described in the embodiment as being a smart phone, the portable digital display device can be a smart watch, VR (virtual reality) glasses, tablet, IPAD, dedicated wrist display, and the like, and can work on most devices using android or iOS APPs.

The invention can also be used in low light or NO light conditions, where an auto switch to night vision with non-visible IR LED support, in order to see without being seen in TOTAL darkness.

There can be redundant video recording on either or both the infrared LED sight camera attachment device 1 and/or the portable digital device 400.

The infrared LED sight camera attachment device 1 with app can have an add auto upload for cloud storage.

While the preferred embodiment shows and describes four LEDs, the invention can be used with one to three LEDS and more than four LEDS, arranged in different patterns.

Although the preferred embodiment describes using the infrared sight camera attachment for rails on handguns, the attachment can be used on other weapons, such as but not limited to rifles, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A target sighting system for use with a firearm, having both low light and night vision applications, comprising:
   a target sighting attachment for the firearm having a camera, a plurality of front facing Light Emitting Diodes (LEDs) adjacent the camera, and an image sender for sending a live target image from the camera to another location, a front facing windage camera adjustment adapter for adjusting horizontal position of the camera for aiming at the target, and aa front facing elevation camera adjustment adapter for adjusting vertical position of the camera for aiming at the target;
   a reticle superimposed on the live target image, wherein the location of the reticle is adjusted by the windage camera adjustment adapter and the elevation camera adjustment adapter;
   an attachment mechanism for attaching the target sighting attachment to the firearm;
   a portable power supply inside the attachment for providing power to the target sighting attachment; and
   a portable display device adjacent to the handgun with the target sighting attachment for displaying the target image on a display, wherein the firearm with the target sighting attachment is adapted to be held by one hand of a user while the portable digital display device is adapted to be held by another hand of the user, wherein the target sighting system is used for both low light and night vision applications.

2. The target sighting system of claim 1, wherein the firearm includes: a rifle.

3. The target sighting system of claim 1, wherein the display device includes a smart phone.

4. The target sighting system of claim 1, wherein the display device includes a smart watch.

5. The target sighting system of claim 1, wherein the display device includes a VR (virtual reality) glasses.

6. The target sighting system of claim 1, wherein the plurality of front facing LEDs includes:
   four infrared LEDs (light emitting diodes).

7. The target sighting system of claim 1, wherein the live target image includes: live video streaming of the target sent by a wireless transmission to the portable digital display device.

8. The target sighting system of claim 1, wherein the attachment mechanism includes:
   clamps for clamping about rails on the firearm.

9. The target sighting system of claim 1, wherein the firearm includes: a handgun.

10. A method of aiming a firearm at an armed target by only exposing one hand of a shooter, holding the firearm facing the armed target, comprising the steps of:
    providing a target sighting attachment for the firearm having a camera, and a plurality of front facing light emitting diodes (LEDs) adjacent the camera;
    attaching the target sighting attachment to the firearm;
    providing a portable power supply inside the attachment for providing power to the target sighting attachment;
    providing a portable display device for displaying a target image on a display;
    aiming the firearm with the target sighting attachment adapted to be held in one hand of the shooter at the target;
    providing a front facing windage camera adjustment adapter for adjusting horizontal position of the camera;
    providing a front facing elevation camera adjustment adapter for adjusting vertical position of the camera;
    providing a reticle superimposed on the live target image, wherein the location of the reticle is adjusted by the front facing windage camera adjustment adapter and the front facing elevation camera adjustment adapter;
    supporting the display device in another hand of the shooter; and
    sending an image of the armed target from the camera to the display device.

11. The method of claim 10, wherein the image includes: a live image.

12. The method of claim 10, further comprising the steps of:
    providing a first set screw for the windage camera adjustment adapter; and
    providing a second set screw for the elevation camera adjustment adapter.

13. A target sighting system for use with a firearm, comprising:
    a target sighting attachment for the firearm having a camera, a plurality of front facing light emitting diodes (LEDs) adjacent the camera, and an image sender for sending a live target image over a transmission medium from the camera to a portable display,
    a front facing windage camera adjustment adapter for adjusting horizontal position of the camera for aiming at the target, and a front facing elevation camera adjustment adapter for adjusting vertical position of the camera for aiming at the target;
    a portable power supply inside the attachment for providing power to the target sighting attachment; and
    an attachment mechanism for attaching the target sighting attachment to the firearm, wherein the firearm with the target sighting attachment is adapted to be held by one hand of a user; and
    a portable display for displaying the target image, the portable display adapted to be held by another hand of the user.

* * * * *